J. R. ROGERS.
CLUTCH.
APPLICATION FILED SEPT. 18, 1913. RENEWED AUG. 18, 1914.
1,132,216.
Patented Mar. 16, 1915.
2 SHEETS—SHEET 1.
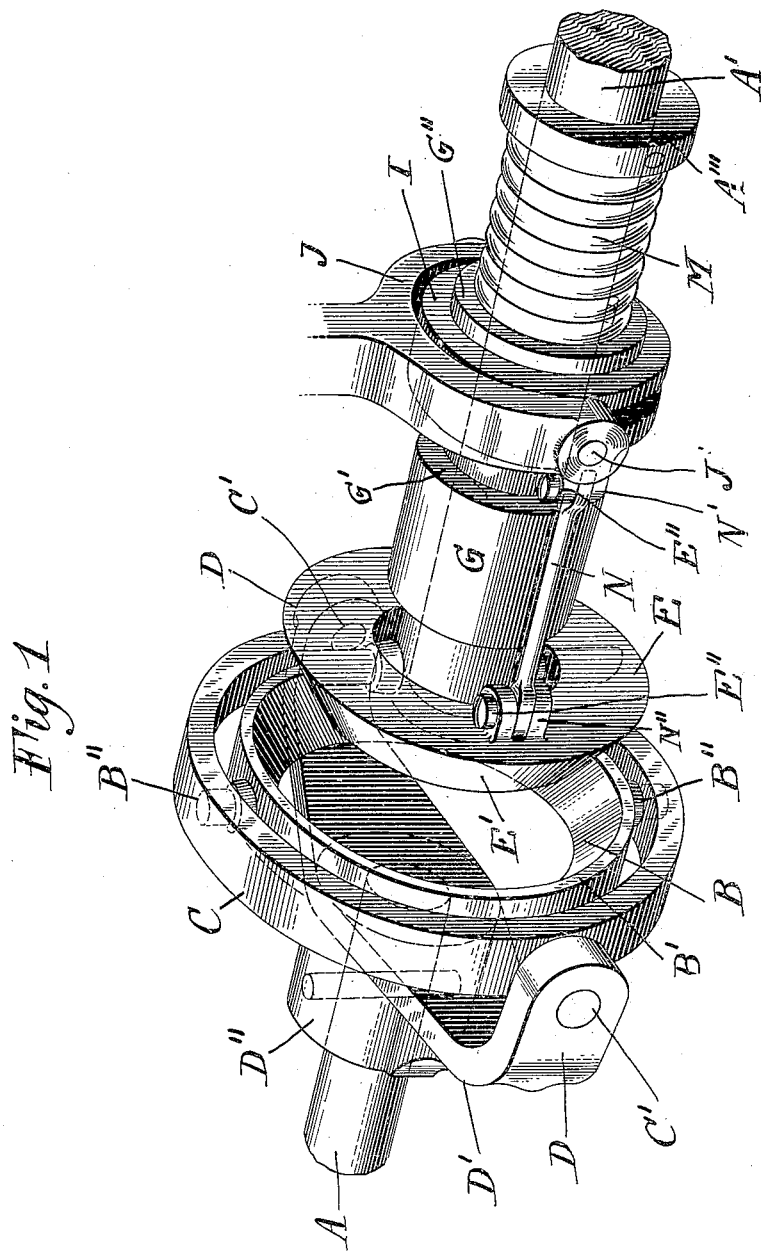
Witnesses:
John R. Rogers, Inventor
By his Attorney J. R. ROGERS.
CLUTCH.
APPLICATION FILED SEPT. 18, 1913. RENEWED AUG. 18, 1914.
1,132,216.
Patented Mar. 16, 1915.
2 SHEETS—SHEET 2.
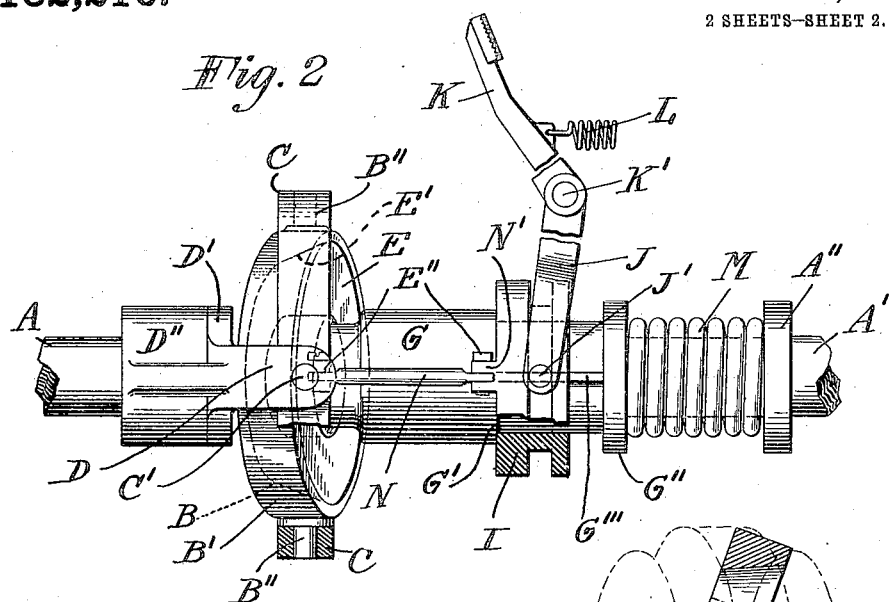
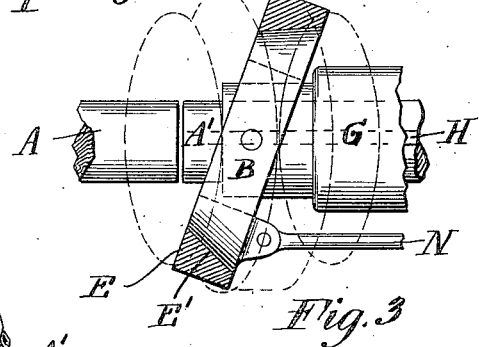
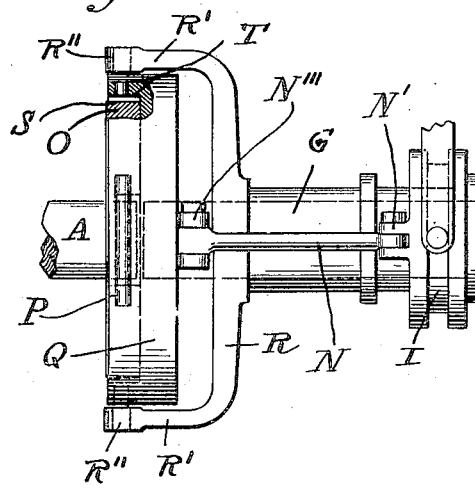
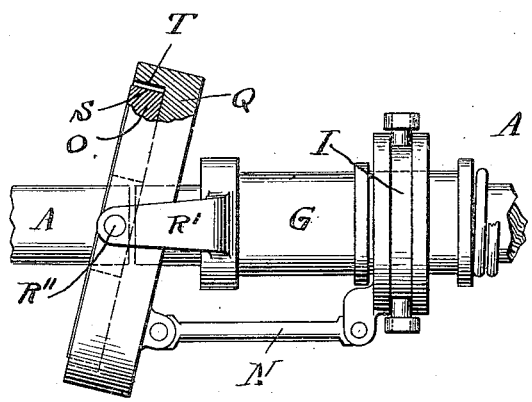
Witnesses:
J. Konigsberg
K. G. Leard
John R. Rogers, Inventor
By his Attorney

UNITED STATES PATENT OFFICE.

JOHN R. ROGERS, OF NEW YORK, N. Y.

CLUTCH.

1,132,216.   Specification of Letters Patent.   Patented Mar. 16, 1915.

Application filed September 18, 1913, Serial No. 790,444. Renewed August 18, 1914. Serial No. 857,423.

*To all whom it may concern:*

Be it known that I, JOHN R. ROGERS, a citizen of the United States of America, residing in the borough of Brooklyn, city of New York, State of New York, have invented a new and useful Improvement in Clutches, of which the following is a specification.

My invention relates to a clutch designed for use in connecting together a driving and a driven shaft, particularly that type of clutch which finds use in connection with automobiles or similar machines, although the invention is not to be understood as being limited to such use as it well finds application wherever a clutch may be employed.

The object of my invention is to provide a clutch which will be cheap to make, efficient in continuous operation, necessitating a minimum of repair and attention and safe in that it will prevent slipping of the clutch faces relative to each other.

It is not an uncommon experience, in driving an automobile up a hill, to have the clutch faces slip relative to each other, compelling the driver to back down hill to get a fresh start at comparatively high speed in order to finally negotiate the hill. Such experiences are exceedingly dangerous and are liable to occur with any of the well known type of clutches now in use. It is one object of my invention to overcome this.

I accomplish the objects of my invention broadly by providing a clutch having friction surfaces which may assume different angles relative to the axis or center line of the shafts and which may slip slightly relative to each other as they engage but which are locked together against the possibility of slipping after full engagement.

In the following I have described, in connection with the accompanying drawings, a structure illustrating one way of practicing my invention with a modification thereof.

In the drawings Figure 1 is a perspective view of a clutch, parts being broken away, showing what I at present consider the preferred form; Fig. 2 is a side elevation of the same, parts being broken away and parts being shown in section; Fig. 3 is a side elevation designed to illustrate the operation of the device somewhat diagrammatically. In this figure parts are omitted, parts are shown in section and parts are broken away for convenience of illustration. Fig. 4 is a side elevation, parts being broken away and parts shown in section, of a modification and Fig. 5 is a plan view of the structure of Fig. 4, showing the clutch members at a different angle to the axis of the shafts from that shown in Fig. 4. Figs. 2 to 5 inclusive are on a smaller scale than Fig. 1. Fig. 1 shows the clutch members disengaged; Figs. 2, 3 and 5 show them fully engaged and Fig. 4 shows them as they engage.

Similar letters of reference indicate similar parts throughout the several views.

Referring to the drawings A indicates the driving shaft and A' the driven shaft. A conical face B is mounted in gimbals on driving shaft A. The gimbals comprise the ring B', carrying the face B, having pivots B'', B'' at its vertical axis engaging ring C having pivots C', C' at its horizontal axis seated in the arms D, D of yoke D' carrying sleeve D'' pinned to shaft A. It is thus possible for the conical face B to have a universal motion to a slight degree.

E indicates a disk pivotally mounted on sleeve G on driven shaft A'. The face E' of disk E is conical and is fitted to engage the conical face B on the driving shaft. The sleeve G is capable of longitudinal motion on shaft A' along the spline H.

E'', E'' are the pivots by means of which disk E is mounted on sleeve G and, as shown, the disk E may have motion on a vertical axis to a slight degree so as to be set at a slight angle to the shaft A'.

The sleeve G is provided with collars or enlarged diameters G' and G'' between which the grooved collar I slides along spline G''', collar I being controlled in its longitudinal movement by yoke J carrying pins J', J' entering the groove in collar I. The yoke J is adapted to be actuated by foot lever K pivoted at K' to any suitable support (not shown) and provided with a spring L, fastened at one end to the lever and at the other end to any suitable support (not shown), adapted to assist in returning lever K to its normal position when released.

M is a spring on shaft A' bearing at one end against collar A'' fast on the shaft A' and at the other against collar G'' of sleeve G, the sleeve being thus normally urged toward the driving shaft A.

N is a link pivoted at one end in bearing N' on collar I and at the other end in bearing N'' on the horizontal axis of disk E.

When sleeve G is retracted by yoke J through pressure on foot lever K, the shafts A and A' are separated and disconnected from each other. When the pressure on lever K is partly released, the spring M drives sleeve G forward and the conical face E' of disk E engages conical face B on ring B' and through the friction of these two faces the shaft A' is caused to revolve by the driving shaft A. After the inertia of shaft A' is overcome, if the pressure on foot lever K is still further released, the spring L, in returning lever K to its normal position, will cause collar I to advance still farther on sleeve G and, through link N, will cause disk E and ring B' to assume an angular position with reference to the respective shafts. When in this position there can be no slipping of the faces B and E' relative to each other and the shafts will therefore be locked together. This is shown diagrammatically in Fig. 3 where the dotted lines indicate the path of a point in the clutch faces when the same are fully engaged and rotating. It is to be noted that the path is inclined relative to the axis of rotation of the shafts and hence the clutch faces cannot be disengaged until they are brought up into right angular position.

In releasing the clutch faces from each other the first movement of the lever K is to bring the clutch faces into right angular position, the continuation of the movement causing the disengagement of the faces from each other.

A modification of construction is shown in Figs. 4 and 5. In this form I have shown flat clutch faces instead of conical and have omitted the means for giving one of the clutch faces a universal movement. In this form the clutch face or disk O is pivotally held on the end of shaft A by a vertically arranged pivot pin P and disk Q is pivoted in arms R', R' of yoke R fast on sleeve G. The link N is pivoted at one end in bearings N''' on disk Q on an axis diametrically at right angles to the axis of pivotal support of disk Q, the other end being pivoted in bearing N' on collar I as above described. The disk Q is recessed to receive disk O as shown. It is obvious that when the pivots R'', R'' and the pivot P are in line, the movement of collar I through link N will cause the clutch faces S and T respectively to assume an angular position with reference to the shafts with the same locking effect as above described and as diagrammatically illustrated in Fig. 3. By this means, when locked, the shafts cannot slip relatively to each other but must rotate as though one solid shaft until the clutch faces S and T are restored to a position at right angles to the axis of the shafts.

It is obvious that in either form illustrated, by the pressure of the foot on lever K, the clutch disks will first be compelled to take a position at right angles to the axis of the shafts and then the friction faces will be withdrawn from contact with each other and the shaft disconnected.

Some of the advantages of my new clutch are that they may be made of any suitable metal or alloy such as cast iron, malleable iron or brass and hence will be cheaper to make than those used at present; there is no tendency to slip after full engagement and hence there are no parts to wear out and to be renewed, such as leather faces or parts as in a multiple disk clutch; the clutch is safer in use than those heretofore used because of the impossibility of slipping when fully engaged, for example in going up hill. The action of the clutch is first frictional and then locking, the final engagement being due to locking rather than to friction.

I do not restrict myself to either of the arrangements described and illustrated or to any of the details disclosed further than the scope of the appended claims demands.

What I claim and desire to secure by Letters Patent is:

1. In a clutch, the combination of a driving shaft, a driven shaft, friction surfaces mounted on each of said shafts and means permitting said friction surfaces to assume an angle inclined relative to the axis of said shafts.

2. In a clutch, the combination of a driving shaft, a driven shaft, friction surfaces mounted on each of said shafts and means permitting said friction surfaces while rotating to assume an angle inclined relative to the axis of said shafts.

3. In a clutch, the combination of a driving shaft, a driven shaft, friction surfaces mounted on each of said shafts and means permitting said friction surfaces to rotate at an angle inclined relative to the axis of said shafts.

4. In a clutch, the combination of a driving shaft, a driven shaft, friction surfaces mounted on each of said shafts, means permitting said friction surfaces to assume an angle inclined relative to the axis of said shafts and means for bringing said friction surfaces into contact with each other first at right angles to the axis of the shafts and afterwards at an inclined angle thereto.

5. In a clutch, the combination of a driving shaft, a driven shaft, a friction surface mounted on each of said shafts, means for engaging said surfaces, means for positively inclining one of said surfaces relatively to the axis of the shafts and means permitting the other of said surfaces to assume the angle of said positively inclined surface.

6. In a clutch, the combination of a driving shaft, a driven shaft, a friction surface pivotally mounted on one of said shafts, a yoke on the other of said shafts, a friction surface pivotally mounted in said yoke, means for bringing said friction surfaces into engagement and means causing said friction surfaces when engaged to assume an angle inclined relative to the axis of the shafts.

7. In a clutch, the combination of a driving shaft, a driven shaft, a friction surface mounted to have a universal movement on one of said shafts, a friction surface pivotally mounted on the other of said shafts, means for causing engagement of said friction surfaces and means for compelling them to assume an angle inclined relative to the axis of the shafts.

8. In a clutch, the combination of a driving shaft, a driven shaft, friction surfaces pivotally mounted on each of said shafts, a lever and a link controlled by said lever and adapted to force said friction surfaces when engaged to assume an angle inclined relative to the axis of said shafts.

9. In a clutch, the combination of a driving shaft, a driven shaft, gimbals mounted on one of said shafts, a friction surface carried by said gimbals, a friction surface pivotally mounted on the other of said shafts and means for compelling said friction surfaces to assume an angle inclined relative to the axis of the shafts.

10. In a clutch, the combination of a driving shaft, a driven shaft, a friction surface pivotally mounted on one of said shafts, a sleeve slidable on the other of said shafts, a friction surface pivotally mounted on said sleeve, a collar slidable on said sleeve and a link actuated by the movement of said collar to cause said friction surfaces when engaged to assume an angle inclined relative to the axis of said shafts.

11. In a clutch, the combination of a driving shaft, a driven shaft, a cone clutch having one member mounted on one of said shafts and the other member on the other of said shafts and means permitting said cone clutch members to assume an angle inclined relative to the axis of said shafts.

12. In a clutch, the combination of a driving shaft, a driven shaft, a sleeve slidably ing one member pivotally mounted on one of said shafts and the other member pivotally mounted on the other of said shafts, a collar slidably mounted on one of said shafts and a link pivoted to said collar and to the clutch member on that shaft whereby the movement of said collar through said link will cause said clutch members when engaged to assume an angle inclined relative to the axis of said shafts.

13. In a clutch, the combination of a driving shaft, a driven shaft, a sleeve slidably mounted on one of said shafts, a cone clutch having one member pivotally mounted on one of said shafts and the other member pivotally mounted on the sleeve on the other of said shafts, a spring adapted to force said clutch members into engagement, a collar slidably mounted on said sleeve and adapted by its movement to cause said clutch members to be disengaged, a lever for actuating said collar and a link pivoted to said collar and to the clutch member on the sleeve and adapted to force said clutch members when engaged to assume an angle inclined relative to the axis of said shafts.

In testimony whereof I have signed this specification in the presence of two subscribing witnesses.

JOHN R. ROGERS.

Witnesses:
K. G. LEARD,
I. KONIGSBERG.

Copies of this patent may be obtained for five cents each, by addressing the "Commissioner of Patents, Washington, D. C."